United States Patent
Matsuo

(10) Patent No.: US 7,896,449 B2
(45) Date of Patent: Mar. 1, 2011

(54) SPROCKET FOR CORELESS CRAWLER TRACK AND STRUCTURE FOR THE SAME

(75) Inventor: Shuichi Matsuo, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 197 days.

(21) Appl. No.: 11/997,676

(22) PCT Filed: Aug. 4, 2006

(86) PCT No.: PCT/JP2006/315489
§ 371 (c)(1),
(2), (4) Date: Apr. 15, 2008

(87) PCT Pub. No.: WO2007/015558
PCT Pub. Date: Feb. 8, 2007

(65) Prior Publication Data
US 2009/0174253 A1    Jul. 9, 2009

(30) Foreign Application Priority Data
Aug. 4, 2005    (JP) ............................. 2005-226557

(51) Int. Cl.
*F16H 57/00* (2006.01)
(52) U.S. Cl. .................. 305/115; 305/195; 305/199
(58) Field of Classification Search .............. 305/100, 305/111–115, 193–195, 199, 178–179, 173, 305/175; 474/153, 158, 160
See application file for complete search history.

(56) References Cited

U.S. PATENT DOCUMENTS

| 3,880,478 | A | * | 4/1975 | Baylor | 305/115 |
| 4,957,472 | A | * | 9/1990 | Nakano | 474/203 |
| 5,769,512 | A | * | 6/1998 | Kautsch | 305/199 |
| 6,000,766 | A | | 12/1999 | Takeuchi et al. | |
| 6,371,579 | B1 | * | 4/2002 | Phely | 305/115 |
| 6,698,850 | B2 | * | 3/2004 | Ueno | 305/115 |
| 6,848,757 | B2 | * | 2/2005 | Ueno | 305/115 |
| 6,976,742 | B2 | * | 12/2005 | Girard et al. | 305/199 |

FOREIGN PATENT DOCUMENTS

| EP | 1 273 504 A1 | 1/2003 |
| JP | 55-95981 U | 7/1980 |
| JP | 55-106183 U | 7/1980 |
| JP | 61-127087 U | 8/1986 |
| JP | 2003-11860 A | 1/2003 |
| JP | 2003-48574 A | 2/2003 |
| JP | 2003-226271 A | 8/2003 |
| JP | 2003-276660 A | 10/2003 |

OTHER PUBLICATIONS

Extended European Search Report dated Oct. 10, 2008 (6 pages).

* cited by examiner

*Primary Examiner*—Jason R Bellinger
(74) *Attorney, Agent, or Firm*—Sughrue Mion, PLLC

(57) ABSTRACT

A sprocket used to transmit drive force to a coreless crawler track having rubber projections arranged at predetermined intervals on the inner peripheral surface of the crawler track. The sprocket has, on its circumferential edge, sprocket teeth arranged at the same pitch as the rubber projections. A cutout is formed at the outer circumferential tip of each sprocket tooth. Even if meshing between the rubber projections and the sprocket teeth has a trouble caused by the entry of soil and sands, the rubber projections are affected less, which greatly contributes to improvement of durability of the crawler track.

10 Claims, 6 Drawing Sheets

180
SPROCKET FOR CORELESS CRAWLER TRACK AND STRUCTURE FOR THE SAME

TECHNICAL FIELD

The present invention relates to a sprocket structure for a coreless crawler track, and relates to a sprocket structure in which, even if there is an accumulation of soil and sand at the inner peripheral surface of the crawler track, there is little effect on rubber projections.

BACKGROUND TECHNOLOGY

Among crawler tracks, there are those in which cores are embedded at a uniform pitch in the longitudinal direction of the crawler track, and so-called coreless crawler tracks in which cores are not embedded at all. The rigidity of the latter as a crawler track overall is substantially uniform, and therefore, the latter is mounted to a relatively high speed vehicle and used for traveling.

Further, with regard to the transmitting of drive force to such a coreless crawler track, rubber projections are formed at a uniform pitch at the inner peripheral surface of the crawler track, and on the other hand, sprockets are provided at the drive shafts of the vehicle, and the sprocket teeth engage with the rubber projections and transmit drive force. Further, usually, flange portions are fixed to the left and the right of the peripheral edge of the sprocket, and these flange portions are structured so as to rotate while contacting the left and right inner peripheral surfaces of the projections of the crawler track.

FIG. 1 is a cross-sectional view showing the relationship between such a crawler track and a sprocket, and FIG. 2 is a side view thereof. In the figures, 10 is a coreless crawler track, and rubber projections 11 are formed at a uniform pitch at the inner peripheral side thereof, and rubber lugs 12 are formed at the outer peripheral side. Such lugs 12 travel while contacting a road surface.

Reference numeral 20 is a sprocket, and teeth (here, pins) 21 stand erect at the peripheral edge thereof at the same pitch as the aforementioned rubber projections 11, and further, flange portions 22 are provided at the left and right of the peripheral edge. The pins 21 engage with the rubber projections 11, and the flange portions 22 contact the inner peripheral surface of the crawler track and transmit drive force.

Moreover, soil and sand A entering into an inner peripheral surface 10a of the crawler track 10 while traveling cannot be avoided, and the phenomenon in which this accumulates at the inner peripheral surface arises. FIG. 3 is a cross-sectional view showing this state, and FIG. 4 is a side view thereof. When such a phenomenon arises, the positional relationship between the crawler track 10 and the sprocket 20 becomes offset from the expected state. Therefore, what is particularly affected is the rubber projections 11, and because drive force is applied while the pins 21 are offset from the proper meshing positions, great strain arises at the rubber projections 11, and there have been cases in which they have been damaged.

SUMMARY OF THE INVENTION

The present invention provides a unique sprocket structure for reducing damage to such rubber projections.

The gist of the present invention is a sprocket structure for a coreless crawler track, which is a sprocket used in transmitting drive force of a coreless crawler track having rubber projections provided at an inner peripheral surface at a uniform pitch, comprising sprocket teeth such as pins or gears or the like at a peripheral edge at a same pitch as the pitch of the rubber projections, and comprising cut-out portions at outer peripheral distal ends of the sprocket teeth. Further, this is usually a sprocket structure comprising flange portions at left and right of the sprocket teeth.

At the sprocket teeth of the present invention, cut-outs are formed in the outer peripheral distal end portions of the regions of contact with the rubber projections. Due thereto, even in cases in which trouble arises in the meshing of the rubber projections and the sprocket teeth due to the entry of soil and sand or the like, the rubber projections are affected less, which greatly contributes to improvement of the durability of the crawler track.

DETAILED DESCRIPTION OF THE INVENTION

In a case in which soil and sand or the like accumulate at the inner peripheral surface of a crawler track and, in this state, rubber projections of the crawler track and sprocket teeth are meshed-together, the sprocket teeth contact vicinities of the peak portions of the rubber projections, and, in particular, due to the wrenching of the rubber projections by the outer peripheral distal ends of the sprocket teeth, defects of the rubber projections arise. The present invention has been made in order to reduce the occurrence of such wrenching, and cuts out in advance the outer peripheral distal ends of the sprocket teeth. Accordingly, even in cases in which soil and sand or the like accumulate at the inner peripheral surface of the crawler track, the occurrence of wrenching at the rubber projections is reduced or does not occur at all.

Further, the shapes of the cut-out portions are preferably similar in shape to the distal end shape of the rubber projections, so that contact between the two becomes substantially uniform.

Figure 1:
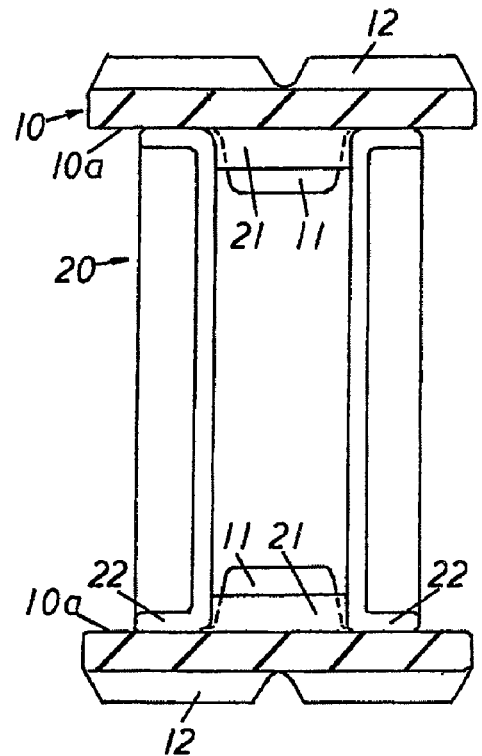
FIG. 1 is a cross-sectional view showing the relationship between a crawler track and a sprocket in a conventional sprocket structure.
Figure 2:
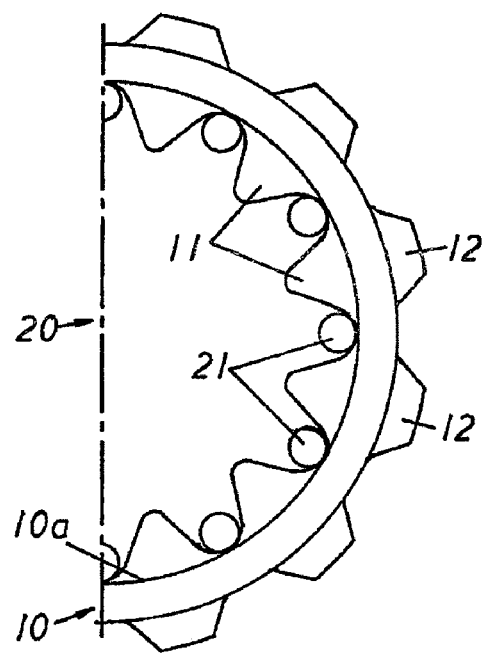
FIG. 2 is a side view of the sprocket structure shown in FIG. 1.
Figure 3:
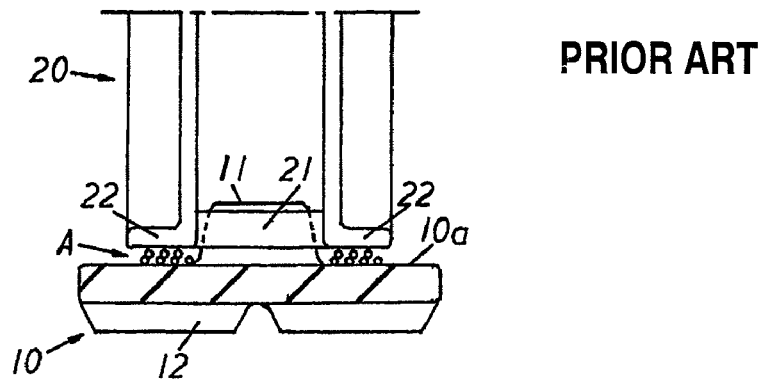
FIG. 3 is a cross-sectional view of the sprocket structure shown in FIG. 1, and shows a state at the time when soil and sand or the like accumulate at the crawler track.
Figure 4:
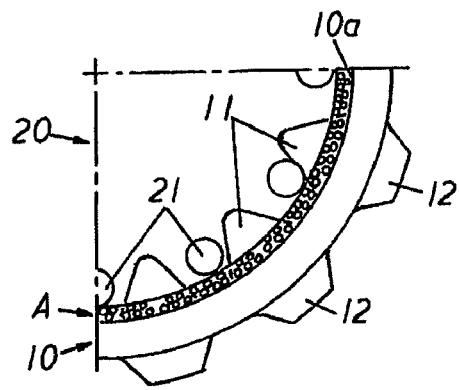
FIG. 4 is a side view of the sprocket structure shown in FIG. 3.
Figure 5:
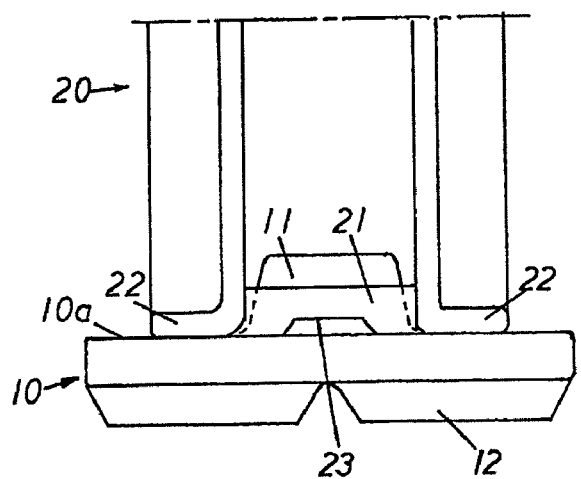
FIG. 5 is a cross-sectional view of a sprocket structure of the present invention, and shows the relationship between a sprocket and a crawler track.
Figure 6:
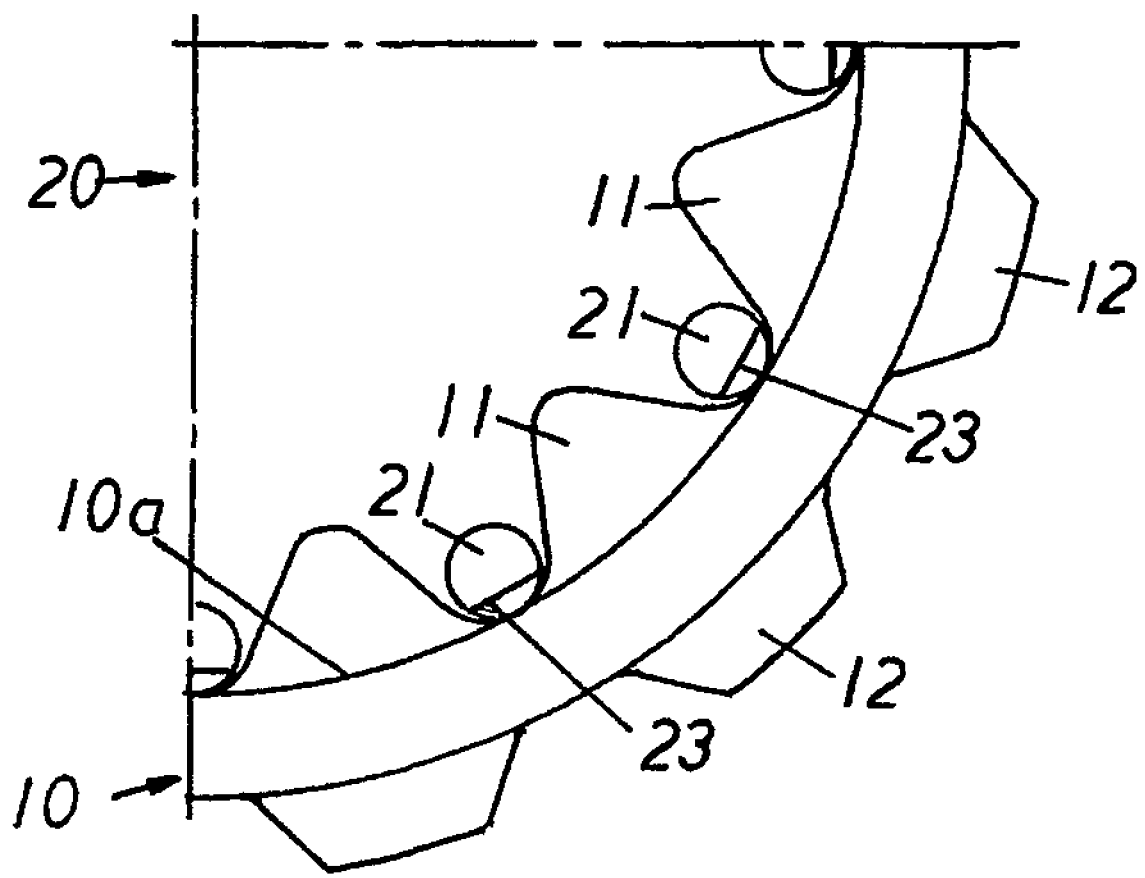
FIG. 6 is a side view of the sprocket structure shown in FIG. 5.

The present invention will be described in further detail hereinafter by using the drawings. FIG. 5 is a cross-sectional view showing the relationship between a sprocket and a crawler track of the present invention, and FIG. 6 is a side view thereof. Further, the teeth of the sprocket 20 are the pins 21, and the outer peripheral distal end of the central portion of the pin 21 is a cut-out structure (23). The shape of such a cut-out portion 23 is a shape which substantially resembles the shape of the peak portion of the rubber projection 11. Further, the cut-out portion 23 is meshed with the rubber projection 11 at the proper position.

Figure 7:
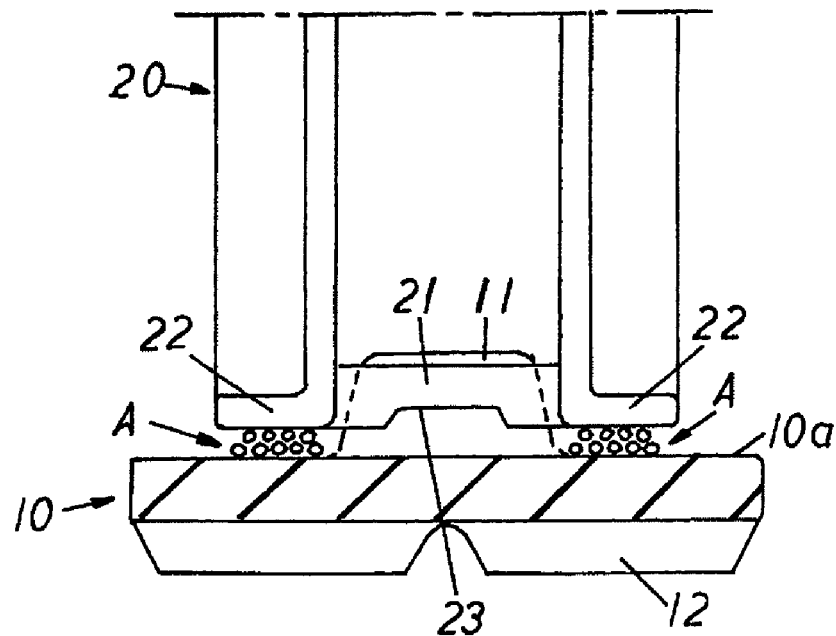
FIG. 7 is a cross-sectional view of the sprocket structure shown in FIG. 5, and shows a state at the time when soil and sand or the like accumulate at the crawler track.
Figure 8:
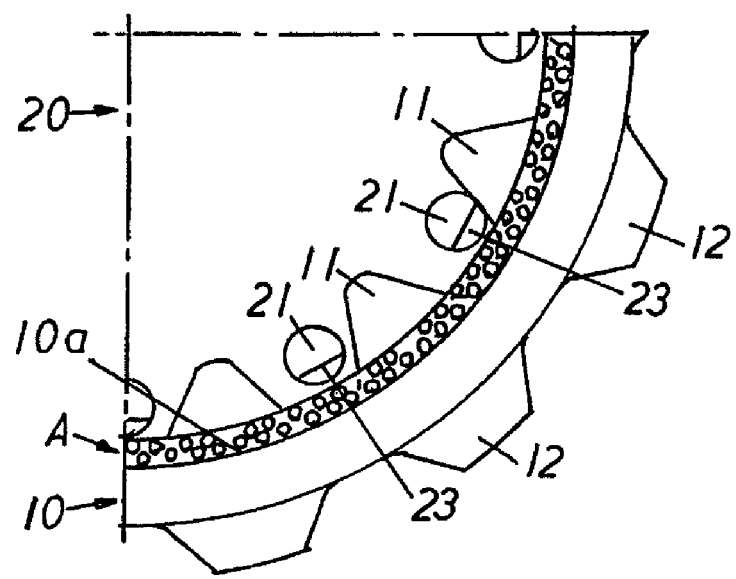
FIG. 8 is a side view of the sprocket structure shown in FIG. 7.

A case in which the soil and sand A accumulate at the inner peripheral surface 10a of the above-described crawler track 10 is shown in FIGS. 7-8. As is clear from these drawings, because the central portion of the pin 21 is cut-out (refer to the cut-out portion 23), even if it contacts in a vicinity of the peak portion of the rubber projection 11, due to the outer peripheral distal end of the pin 21 where wrenching arises being cut-out, the place where the wrenching is brought forth is narrowed. Thus, damage of the rubber projection 11 is reduced. Further, there are also the advantages that the generation of abnormal sound due to wrenching is reduced, rotation of the sprocket is not impeded, and traveling is smooth.

Figure 9:
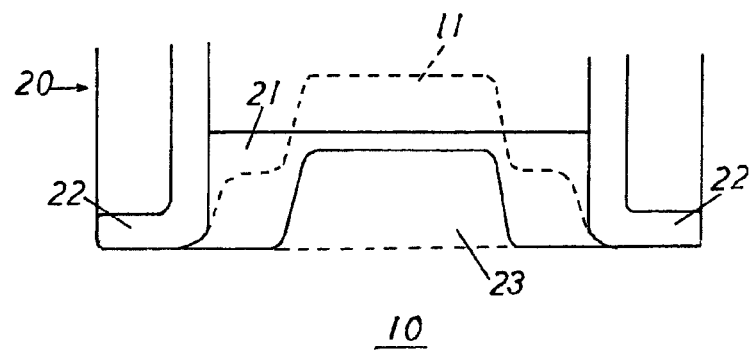
FIG. 9 is a cross-sectional view showing a deformed state of the sprocket structure shown in FIG. 5.
Figure 10:
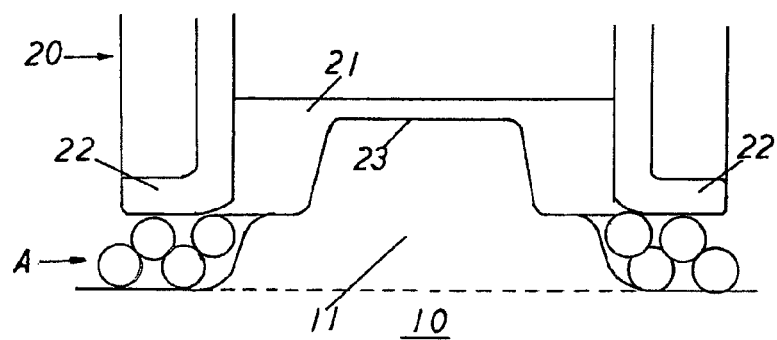
FIG. 10 is a cross-sectional view showing a state at the time when soil and sand or the like accumulate at the sprocket structure shown in FIG. 9.

Further, in a case in which the shape of the cut-out portion 23 is made to be the same as the shape of the peak portion of the rubber projection 11, or in a case in which it is made to be greater than that, if soil and sand or the like accumulate and the inner peripheral surface 10a of the crawler track 10 is moved away from the sprocket 20, the rubber projection 11 passing by this cut-out portion 23 occurs in a state where both do not contact at all. FIG. 9 is an example in which soil and sand or the like do not accumulate, and FIG. 10 shows a case in which soil and sand or the like accumulate at the inner peripheral surface 10a of the crawler track 10 and the peak portion of the rubber projection 11 passes by without contacting the interior of the cut-out portion 23.

Further, in a case in which soil and sand or the like accumulate, the sprocket 20 and the rubber projection 11 do not mesh-together normally. Therefore, when they contact, the rubber projection 11 is damaged. As in the example of FIG. 10, absolutely no contact between the rubber projection 11 and the cut-out portion 23 is the optimal state. Further, because the soil and sand A becomes sandwiched between the sprocket 20 and the rubber crawler track 10, great tension is applied to both. Therefore, normal travel is possible because the drive force is transmitted from the sprocket 20 to the soil and sand A and from the soil and sand A to the rubber crawler track 10.

Figure 11:
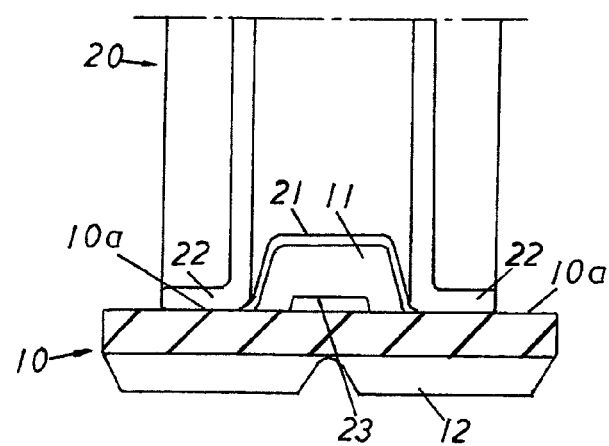
FIG. 11 is a cross-sectional view of a gear-type sprocket structure.
Figure 12:
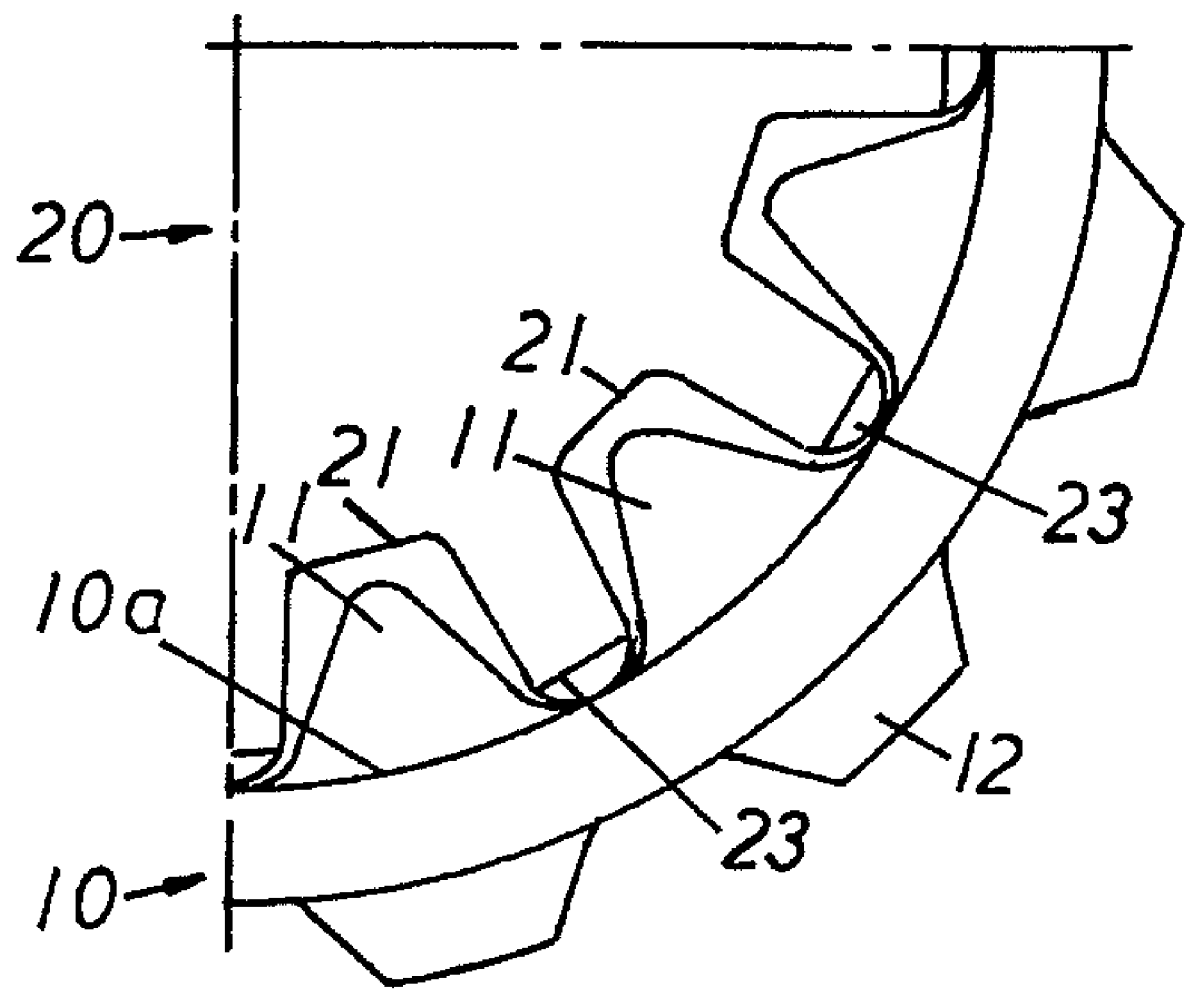
FIG. 12 is a side view of the sprocket structure shown in FIG. 11.

The present invention has been described above with regard to pin-type sprocket teeth, but the present invention is not limited to the same, and can also be applied as well to a gear-type sprocket at which sprocket teeth are structured by tooth-shaped portions formed at the outer peripheral surface of the sprocket, and FIG. 11 shows a cross-sectional view thereof, and FIG. 12 shows a side view.

INDUSTRIAL APPLICABILITY

As described above, the present invention is suitable in particular for a coreless crawler track which travels on damp ground or marshy ground, and even if soil and sand or the like accumulate at the inner peripheral surface of the crawler track, traveling is possible without removing it, and the range of use of the present invention is extremely wide.

DESCRIPTION OF THE REFERENCE NUMERALS

10 . . . coreless crawler track,
10a . . . inner peripheral surface of crawler track,
11 . . . rubber projection,
12 . . . rubber lug,
20 . . . sprocket,
21 . . . sprocket tooth,
22 . . . flange portion,
23 . . . cut-out portion,
A . . . soil and sand.

The invention claimed is:

1. A sprocket structure for a coreless crawler track, which is a sprocket used in transmitting drive force of the coreless crawler track having rubber projections provided at an inner peripheral surface at a uniform pitch, comprising sprocket teeth at a peripheral edge at a same pitch as the pitch of the rubber projections, and comprising cut-out portions at outer peripheral distal ends of the sprocket teeth,
   wherein the cut-out portions traverse less than a full width of the rubber projections to allow portions of the sprocket teeth to the left and right of the cut-out portions to contact the rubber projections.

2. The sprocket structure for a coreless crawler track of claim 1, wherein the sprocket teeth are pin-type.

3. The sprocket structure for a coreless crawler track of claim 1, wherein the sprocket teeth are gear-type.

4. The sprocket structure for a coreless crawler track of claim 1, comprising flange portions at left and right sides of the sprocket teeth.

5. The sprocket structure for a coreless crawler track of claim 1, wherein the cut-out portions have shapes that are substantially similar to peak portions of the rubber projections provided at the inner peripheral surface of the crawler track.

6. A sprocket for a coreless crawler track, which is a sprocket used in transmitting drive force to the coreless crawler track, the sprocket comprising sprocket teeth that are formed along a peripheral edge at a substantially uniform pitch and engage with rubber projections provided at an inner peripheral surface of the crawler track, and the sprocket teeth have cut-out portions at outer peripheral distal ends,
   wherein the cut-out portions traverse less than a full width of the rubber projections to allow portions of the sprocket teeth to the left and right of the cut-out portions to contact the rubber projections.

7. The sprocket for a coreless crawler track of claim 6, wherein the sprocket teeth are formed by pins.

8. The sprocket for a coreless crawler track of claim 6, wherein the sprocket teeth are structured by tooth-shaped portions formed at an outer peripheral surface of the sprocket.

9. The sprocket for a coreless crawler track of claim 6, wherein the sprocket has flange portions at left and right side portions of the sprocket teeth.

10. The sprocket for a coreless crawler track of claim 6, wherein the cut-out portions have shapes that are substantially similar to peak portions of the rubber projections provided at the inner peripheral surface of the crawler track.

* * * * *